April 26, 1932.  S H H. KUENZEL  1,855,245
ADJUSTABLE SEAT
Filed Jan. 5, 1931
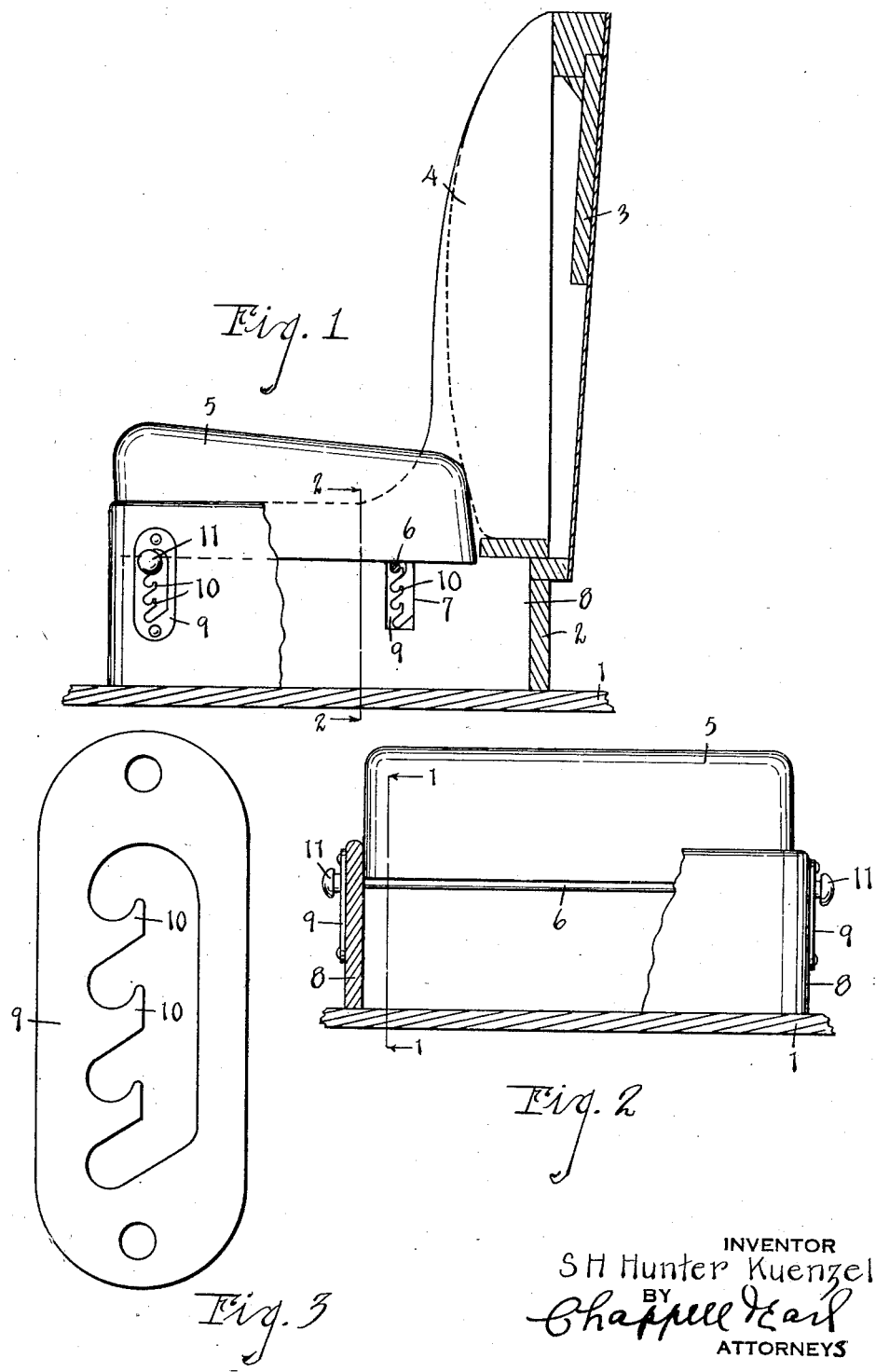
INVENTOR
S H Hunter Kuenzel
BY
Chappell Earl
ATTORNEYS Patented Apr. 26, 1932

1,855,245

UNITED STATES PATENT OFFICE

S H HUNTER KUENZEL, OF KALAMAZOO, MICHIGAN, ASSIGNOR TO CHECKER CAB MANUFACTURING CORPORATION, OF KALAMAZOO, MICHIGAN

ADJUSTABLE SEAT

Application filed January 5, 1931. Serial No. 506,574.

The main object of this invention is to provide an adjustable seat for motor vehicles, such as seats for taxicab drivers, which may be quickly and easily adjusted to suit the particular driver.

A further object is to provide a seat having these advantages which may be very economically embodied in the vehicle.

Objects pertaining to details and economies of my invention will definitely appear from the description to follow. The invention is defined in the claim.

A structure embodying the features of my invention is clearly illustrated in the accompanying drawings, in which:

Fig. 1 is a fragmentary view mainly in section on line 1—1 of Fig. 2 of a motor vehicle seat embodying the features of my invention.

Fig. 2 is a fragmentary view partially in vertical section on line 2—2 of Fig. 1.

Fig. 3 is an enlarged elevation of one of the supporting plates or racks for the seat.

In the structure illustrated, 1 represents the front of the vehicle, 2 the seat base and 3 the back of the seat. The back of the seat is provided with a cushion 4 shown by dotted lines. The seat 5 is adjustably supported on the base by means of the rods 6 which are arranged through slots 7 in the side members 8 of the seat base. Rack plates 9 are mounted on the outer side of these side members 8 and have slots therein to register with the slots 7. These rack teeth have upwardly inclined lug-like teeth 10 along one edge with which the seat supporting rods may be selectively engaged. The rods are provided with knobs or handholds 11 at their ends.

The seat is shown in Fig. 1 adjusted to its highest point and may be very considerably lowered, and it may be tilted to various positions by adjustment of the rods.

I have illustrated my improvements as embodied in a seat for motor vehicles. I have not attempted to illustrate or describe other embodiments or adaptations as it is believed that this disclosure will enable those skilled in the art to embody or adapt the same as may be desired.

Having thus described my invention what I claim as new and desire to secure by Letters Patent is:

The combination with a seat, of a base comprising opposed side members having vertical slots therein, slotted plates mounted on said side members with their slots in register with the slots of said side members, said plates being provided along one edge with a plurality of upwardly inclined spaced lugs, and seat supporting rods arranged through said slots in said plates and selectively engageable with said lugs.

In witness whereof I have hereunto set my hand.

S H HUNTER KUENZEL.